United States Patent [19]
Wu

[11] Patent Number: 5,690,445
[45] Date of Patent: Nov. 25, 1997

[54] HIGH-SPEED ASSEMBLY CONNECTOR STRUCTURE

[76] Inventor: Ta-Chin Wu, No.1,Lane 3,Section 2,Hwanher West Road, Yeng Her,Taipei, Taiwan

[21] Appl. No.: 644,299

[22] Filed: May 13, 1996

[51] Int. Cl.$^6$ .............................. B25G 3/00; B23B 31/00
[52] U.S. Cl. ................ 403/306; 403/13; 403/307; 403/374; 408/239 R
[58] Field of Search ...................... 403/306, 307, 403/305, 301, 300, 320, 321, 324, 13, 362, 373, 374; 279/86, 77; 408/239 R, 238

[56] References Cited

U.S. PATENT DOCUMENTS

| | | | |
|---|---|---|---|
| 1,332,898 | 3/1920 | Wild et al. | 403/362 X |
| 1,861,504 | 6/1932 | Maxfield | 279/77 |
| 2,309,249 | 1/1943 | Karp | 403/305 |
| 2,653,060 | 9/1953 | Rubenstein | 403/305 X |
| 2,714,026 | 7/1955 | Schultz | 403/301 X |
| 2,726,091 | 12/1955 | Topar | 403/300 X |
| 2,781,199 | 2/1957 | Veldhuizen | 279/77 |
| 2,816,770 | 12/1957 | Vleig et al. | 279/77 X |
| 4,514,117 | 4/1985 | Scott | 408/239 R |
| 4,798,100 | 1/1989 | Baumgarten | 403/374 X |
| 5,277,435 | 1/1994 | Kramer et al. | 408/239 R X |
| 5,501,542 | 3/1996 | Hall, Sr. | 403/306 |
| 5,525,005 | 6/1996 | Chen | 403/373 X |

FOREIGN PATENT DOCUMENTS 3501889  1/1985  Germany .................... 279/86

*Primary Examiner*—Kenneth J. Dorner
*Assistant Examiner*—William L. Miller
*Attorney, Agent, or Firm*—Bacon & Thomas

[57] ABSTRACT

A high speed assembly connection structure that consists of a direction screw of a connector head that fits in a direction slot of a tool element which causes the tool element to be limited to a specified direction. A set screw of the connector head protrudes into a cambered groove of the handle, which limits the rotation of the handle within a specified range. An entry position notch of the handle holds the tool element in a specified direction during assembly and a mounting slot of the tool element enables the tight engagement of the handle after the handle is rotated. Furthermore, in the operation of this structure, no additional tools are required to accomplish the rapid installation of the tool element.

2 Claims, 3 Drawing Sheets

HIGH-SPEED ASSEMBLY CONNECTOR STRUCTURE

BACKGROUND OF THE INVENTION

Due to the rapid development of technology, improved living standards has led to the low volume manufacturing of a wider range of products by industry. As a result, there has been a shortening of the tooling utilization period of manufacturers in every product category. In other words, the wastage involved in the re-tooling periods has increased. The production volume during output periods has also been reduced. The problem during the re-tooling period is that different tools are required. Taking lathes as an example, there are a number of bolts securing the cutting blades onto the blade holder and each blade change requires a wrench for the manual loosening of the bolts, a repetitious task that wastes much time and involves drifts and various other bladed tools, etc. The replacement can become even more difficult if a very small tool that is needed is misplaced.

In view of the foregoing situation, the inventor of the invention herein eventually thought to provide a kind of improved structural system in place of the past art. Continuous research, testing and improvements have finally culminated in the invention herein, which is revolutionary in that the aforementioned disadvantages are effectively overcome.

Therefore, the invention herein is a kind of high-speed assembly connector structure, of which the entry position notch of the handle fits onto the mounting notch of the machine equipment to enable tool tip installation that is simple, tight and involves a brief replacement time thereby increasing production volume, and this is among the major design objectives of the invention herein.

To further understand the structural characteristics and innovative content of the invention herein, the practical embodiments as well as the drawings and detailed description of the invention herein are provided to elaborate upon the advantages and innovations of the invention herein.

DETAILED DESCRIPTION OF THE PREFERRED EMBODIMENT

Figure 1:
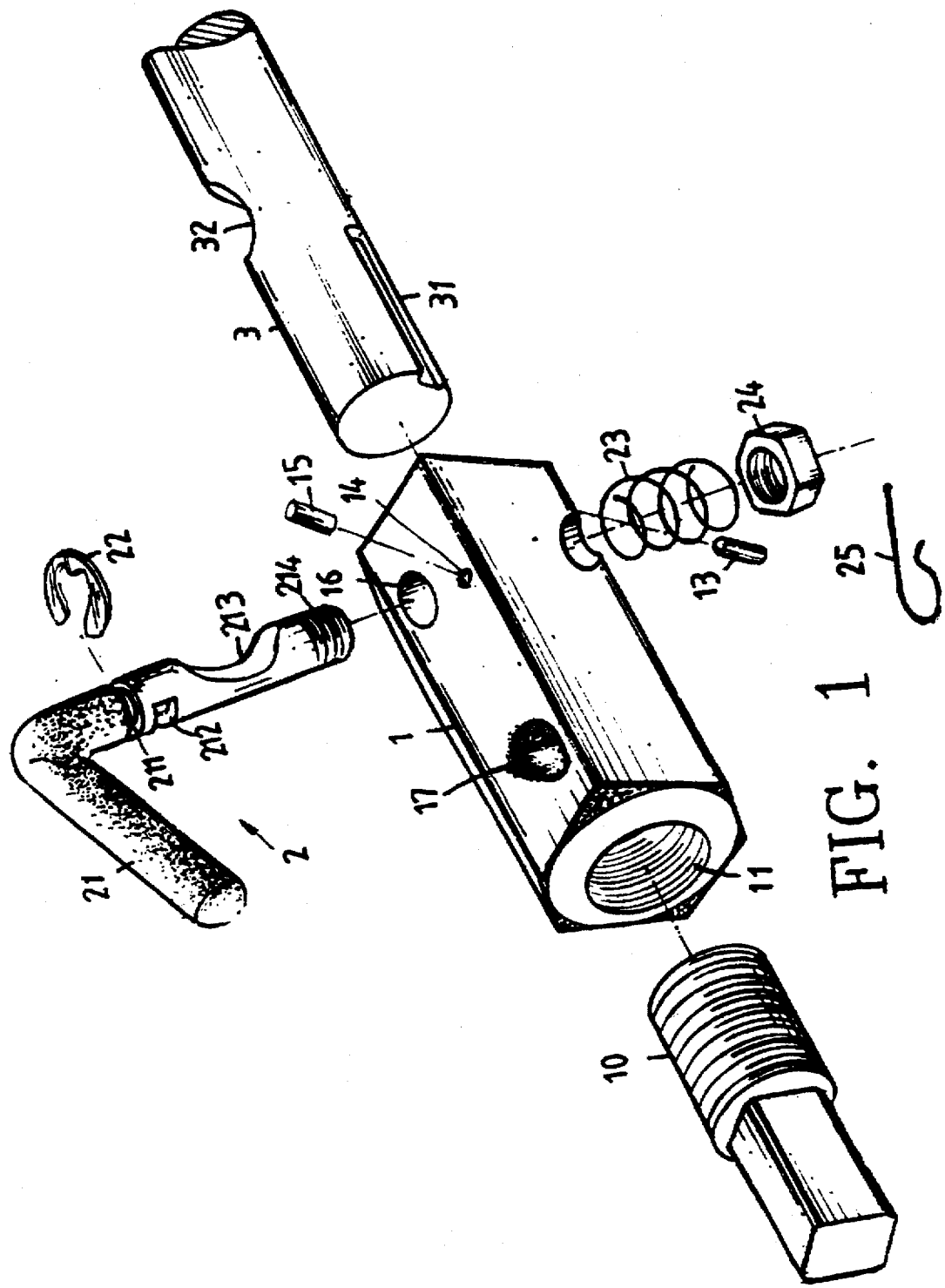
FIG. 1 is an exploded drawing of the invention herein.

The invention herein is a kind of high-speed assembly connector structure that is mainly comprised of a connector head (1), a self-contained handle assembly (2) and a matching direction slot (3); as indicated in FIG. 1, the connector head (1) is tubular in shape with a connector hole (11) that extends length-wise through the interior and one end is connected to the machine equipment or connected to the machine equipment through a fastening component (10), of which the cut end of the aforesaid fastening component (10) fits onto the machine equipment and the other end is fitted to the connector hole (11), and the other end of the connector hole (11) is utilized to hold a direction slot (3); there is a direction screw hole (12) of small diameter on the connector head (1) and the aforesaid hole vertically penetrates the axial center line of the connector hole (11) and, furthermore, accommodates a direction screw (13) in the section that continues through the tubular wall of the connector head (1), which is utilized to limit the insertion direction of the direction slot (3); extending vertically through the connector head (1) and, furthermore, through the axial center line of the handle assembly (2) is a set screw hole (14) that holds a set screw (15) which provides the handle assembly (2) with a rotational positioning function; extending vertically through the connector hole (11) on the connector head (1) is a handle hole (16), and the axial line of the aforesaid hole is positioned at the upper extent of the connector hole (11) to accommodate the handle assembly (2); a handle set hole (17) of small diameter is at the side of the handle hole (16) to provide for the overall positioning function of the handle assembly (2).

The handle assembly (2) is mainly comprised of an L-shaped handle (21), a snap ring (22), a spring cotter (25) and other components, and at one end of the L-shaped handle (21) is an annular groove (211) that provides for the installation of the snap ring (22); on the outer side of the annular groove (211) is a cambered groove (212), and the aforesaid cambered groove (212) consists of a semicircular notch which supports the set screw (15) of the connector head (1) such that the rotation of the handle (21) is limited within a specific position; and on the outer side of the cambered groove (212) is an entry position notch (213) that is semicircular in shape, which provides for the insertion and installation of the direction slot (3); extending through the end of the handle (21) is a cotter pin hole (214) that provides for the insertion of the spring cotter (25) that enables the positioning of the overall handle assembly (2).

The aforementioned direction slot (3) consists of the attachment end of a typical tool such as a blade, drift or cutter, etc., of which the improved section of the direction slot (3) is a direction slot (31) extending along the axial line and, furthermore, a mounting notch (32) in vertical alignment to the axial line that provides for the anchoring of the handle (21).

Figure 2:
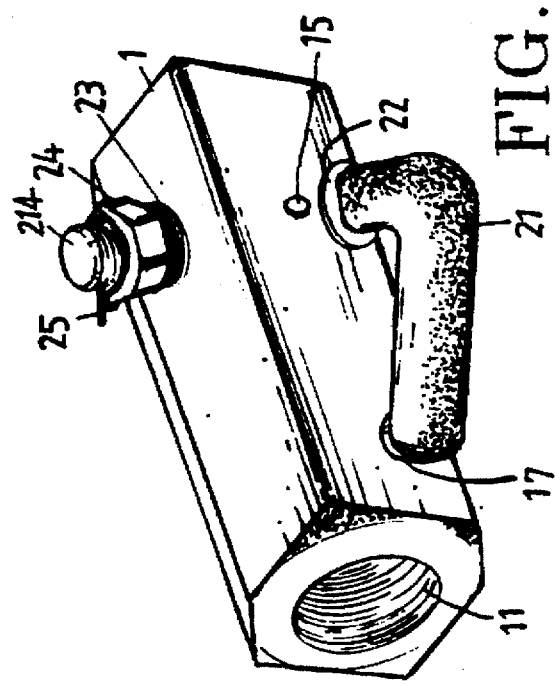
FIG. 2 is an isometric drawing of the exterior of the invention herein.

When the high-speed assembly connector structure of the invention herein is assembled, as indicated in FIG. 1 and FIG. 2, the direction screw (13) is first inserted into the direction screw hole (12); furthermore, the snap ring (22) is installed onto the annular groove (211) on the handle (21) and then the handle (21) is inserted into the handle hole (16) and, furthermore, the set screw (15) is placed into set screw hole (14) such that the set screw (15) protrudes into the cambered groove (212) of the handle (21); at the same time, the coil spring (23) and the nut (24) are placed onto the other opposite end of the handle (21); finally, the spring cotter (25) is inserted into the cotter pin hole (214), which completes the overall assembly as indicated in FIG. 2.

Figure 3:
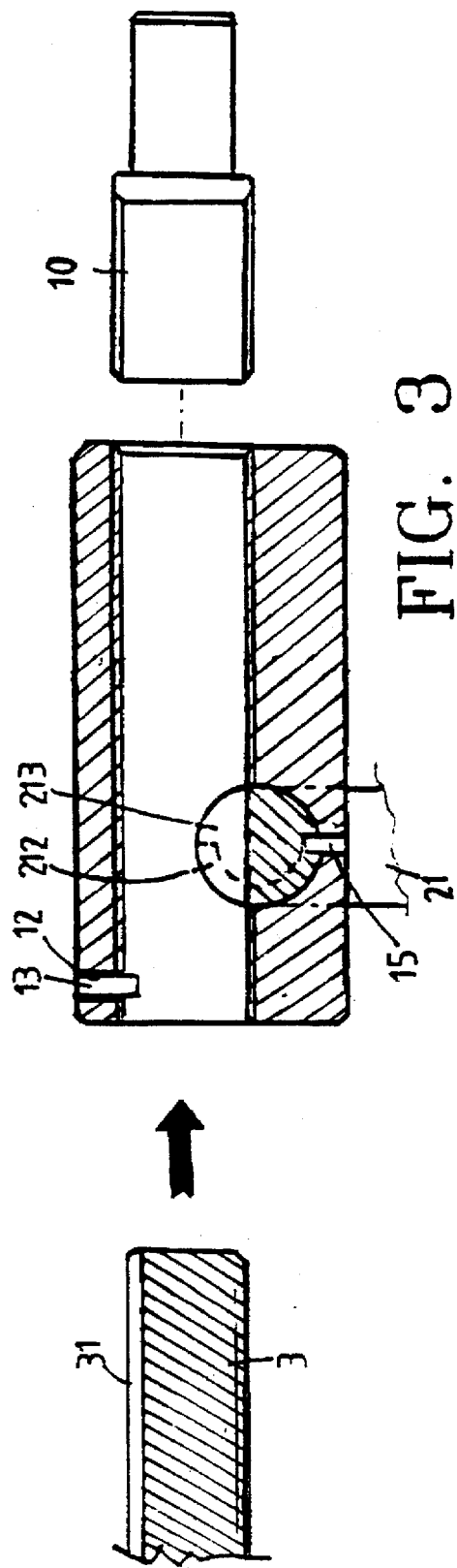
FIG. 3 is a cross-sectional drawing of the invention herein in the insertion placement mode.
Figure 4:
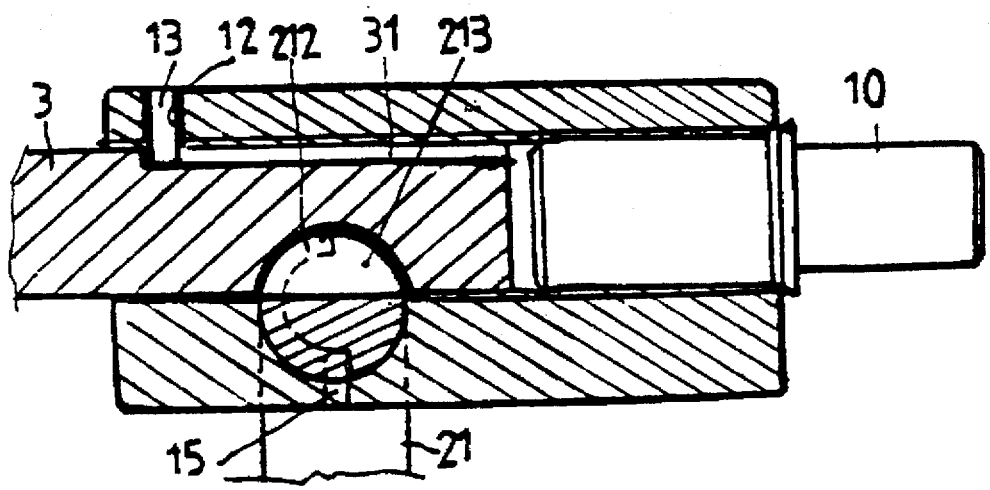
FIG. 4 is a cross-sectional drawing of the invention herein in the mounting mode.
Figure 5:
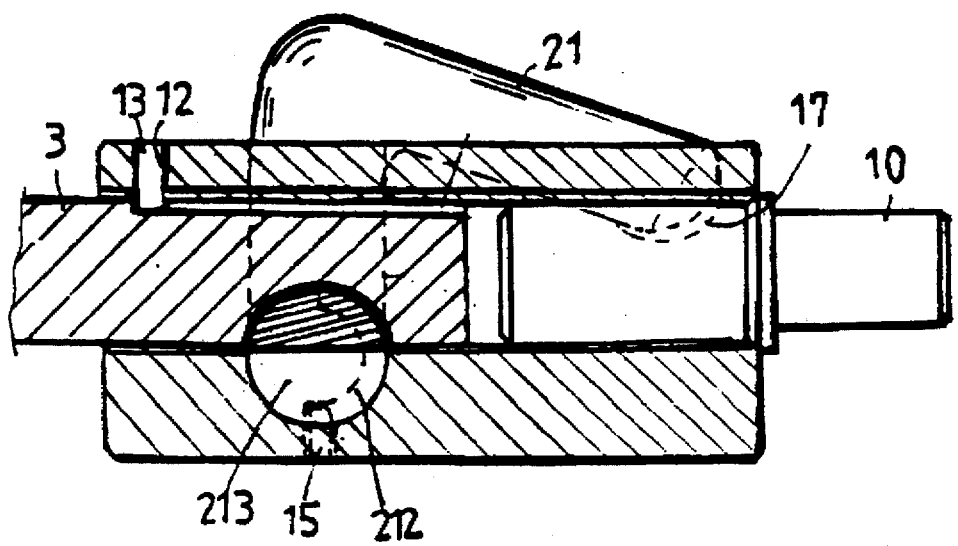
FIG. 5 is a cross-sectional drawing of the invention herein in the completed mounting mode.

When the high-speed assembly connector structure of the invention herein is utilized, as indicated in FIG. 3, FIG. 4 and FIG. 5, when the direction slot (3) is inserted into the connector hole (11) of the connector head (1) as indicated in FIG. 3, the direction slot (31) must be in alignment with the direction screw (13) to facilitate the insertion and assembly, at which time, there is a suitable interval between the axial center of the connector hole (11) and the entry position notch (213) of the handle (21) that enables the insertion and, furthermore, the anchoring of the direction slot (3) into the connector hole (11) as indicated in FIG. 4; with the direction slot (3) now inserted into the connector hole (11) and, furthermore, the entry position notch (213) and the mounting notch (32) are in mutual juxtaposition, the securing operation involves the rotation of the handle (21) by 180 degrees to enable the engagement of the entry position notch (213) of the handle (21) into the mounting notch (32) and the direction slot (3) is then in a fixed state, and the coil spring (23) on the handle (21) is anchored within the handle set hole (17) to prevent the high-speed rotation of the overall structure during vibration while maintaining a tight assembly such that no disengagement occurs, as indicted in FIG. 5.

As mentioned in the foregoing description of the structure, assembly and operation of the high-speed assembly connector structure of the invention herein, the entry position notch (213) of the handle (21) accommodates the insertion of two direction slots (3) and, furthermore, the mounting notch (32) of the direction slot (3) is actuated by the rotation of the handle (21) and thereby provides for three engagement and anchoring functions as well as a simple assembly in which the installation of any tool whatsoever is very convenient, and this is the major design innovation of the invention herein.

The description of the invention herein only constitutes a single embodiment and, therefore, is not limited by any modification in form whatsoever based on related principles and operating methods that yield identical results, all of which shall be effectively attributed to the design of the invention herein and, furthermore, included within the scope and claims of the invention herein.

In summation of the foregoing description, the invention herein is a kind of high-speed assembly connector structure that provides the advantages of a structural assembly requiring no additional tools and ease of installation.

What is claimed is:

1. A high speed assembly connector comprising:

a) a generally tublar connector head having a connector hole therethrough, a direction screw extending into the connector hole and a set screw;

b) a tool element having a mounting notch and a direction slot of predetermined length whereby when the tool element is inserted into the connector hole the direction screw engages the direction slot to limit the length of the insertion of the tool element into the connector head;

c) a handle pivotally connected to the connector head, the handle having an entry position notch and a cambered groove into which the set screw extends to limit the pivoting movement of the handle between an entry position wherein the entry position notch is aligned with the connector hole so as to allow the insertion of the tool element into the connector hole, and an anchoring position wherein a portion of the handle engages the mounting notch of the tool element so as to anchor the tool element in the connector head; and, d) a handle set hole in the connector head engaged by a portion of the handle when in the anchoring position so as to releasably retain the handle in the anchoring position.

2. The high speed connector of claim 1 wherein the connector hole is configured to attach the connector head to a machine.

* * * * *